(12) United States Patent
Hagersten et al.

(10) Patent No.: US 6,377,980 B1
(45) Date of Patent: *Apr. 23, 2002

(54) METHODS AND APPARATUS FOR A DIRECTORY-LESS MEMORY ACCESS PROTOCOL IN A DISTRIBUTED SHARED MEMORY COMPUTER SYSTEM

(75) Inventors: Erik E. Hagersten, Palo Alto, CA (US); Mark Donald Hill, Madison, WI (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/236,679

(22) Filed: Jan. 25, 1999

Related U.S. Application Data

(63) Continuation of application No. 08/671,303, filed on Jul. 1, 1996, now Pat. No. 5,873,117.

(51) Int. Cl.⁷ .............................................. G06F 15/167
(52) U.S. Cl. ........................................ 709/213; 709/214
(58) Field of Search ................................ 711/152, 148, 711/145, 147, 141; 700/5; 709/213, 215, 214

(56) References Cited

U.S. PATENT DOCUMENTS

| | | | |
|---|---|---|---|
| 5,394,555 A | | 2/1995 | Hunter et al. ............... 711/148 |
| 5,535,116 A | | 7/1996 | Gupta et al. .................... 700/5 |
| 5,537,569 A | * | 7/1996 | Masubuchi ................. 711/121 |
| 5,655,101 A | | 8/1997 | O'Farrell et al. ........... 711/148 |
| 5,740,401 A | * | 4/1998 | Hanawa et al. ............. 711/152 |
| 5,983,326 A | * | 11/1999 | Hagersten et al. .......... 711/147 |
| 6,073,216 A | * | 6/2000 | McDonald et al. ......... 711/141 |
| 6,138,217 A | * | 10/2000 | Hamaguchi ................. 711/141 |

FOREIGN PATENT DOCUMENTS

EP    0 392 657    10/1990

OTHER PUBLICATIONS

Archibald, et al., "An Economical Solution to the Cache Coherence Problem," Department of Computer Science, FF–35, University of Washington, Seattle, WA.

(List continued on next page.)

Primary Examiner—Zarni Maung
Assistant Examiner—Jungwon Chang
(74) Attorney, Agent, or Firm—Conley, Rose & Tayon, PC; B. Noël Kivlin

(57) ABSTRACT

A method in a computer network having a first plurality of nodes coupled to a common network infrastructure and a distributed shared memory distributed among the first plurality of nodes for servicing a first memory access request by a first node of the computer network pertaining to a memory block having a home node different from the first node in the computer network. The computer network has no natural ordering mechanism and natural broadcast for servicing memory access requests from the plurality of nodes. The home node has no centralized directory for tracking states of the memory block in the plurality of nodes. The method includes the step of receiving via the common network infrastructure at the home node from the first node the first memory access request for the memory block. There is also included the step of sending, if the home node does not have a first valid copy of the memory block, a request from the home node to a second plurality of nodes in the computer network to request a second node in the computer network to send the first valid copy of the memory block to the first node. The second plurality of nodes represents the first plurality of nodes excepting the first node and the home node. The first valid copy of the memory block represents a valid copy that is capable of servicing the first memory access request.

26 Claims, 5 Drawing Sheets

OTHER PUBLICATIONS

Grahn et al., "Efficient Strategies for Software–Only Directory Protocols in Shared–Memory Multiprocessors," Department of Computer Engineering, Lund University, 8345 Computer Architecture News, (May 23, 1995), No. 2, New York, US.

Kumar et al., "Efficient and Scalable Cache Coherence Schemes for Shared Memory Hypercube Multiprocessors," Department of Computer Science, Texas A&M University, College Station, TX, © 1994 IEEE.

Farkas et al., "Scalable Cache Consistency for Hierarchically Structure Multiprocessors," The Journal of Supercomputing, 8.345–369 (1995) © 1995 Kluwer Academic Publishers, Boston, Manufactured in the Netherlands.

Lovett et al., "STiNG: A CC–NUMA, Computer System for the Commercial Marketplace," Sequent Computer Systems, Inc., Beaverton, OR, ISCA '96 May 1996 PA, USA © ACM 0–89791–786–3/96/0005, pp. 308–317.

O'Krafka et al, "An Empirical Evaluation of Two Memory–Efficient Directory Methods," Department of Electrical Engineering and Computer Sciences, University of California, Berkeley, The 17th Annual International Symposium on Computer Architecture, Seattle, WA, May 28–31, 1990, IEEE Computer Society Press, Los Alamitos, CA, pp. 138–147.

Jim Handy, The Cache Memory Book, Academic Press, Inc., 1993, Section 4.3.1 (pp. 159–161), 1993.

* cited by examiner

*FIG. 3B*
*(PRIOR ART)*

| 212 | | | | |
|---|---|---|---|---|
| NODE 100 | NODE 102 | NODE 104 | NODE 106 | PENDING |
| M 220 | I 222 | I 224 | I 226 | 1/0 |

*FIG. 3C*
*(PRIOR ART)*

| 212 | | | | |
|---|---|---|---|---|
| NODE 100 | NODE 102 | NODE 104 | NODE 106 | PENDING |
| I 230 | I 232 | M 234 | I 236 | 1/0 |

*FIG. 3D*
*(PRIOR ART)*

| 212 | | | | |
|---|---|---|---|---|
| NODE 100 | NODE 102 | NODE 104 | NODE 106 | PENDING |
| S 240 | S 242 | S 244 | I 246 | 1/0 |

| ROW | NODE 100 | NODE 102 | NODE 104 | NODE 106 |
|---|---|---|---|---|
| A | M | I | I | I |
| B | I | I | M | I |
| C | S | S | I | S |
| D | I | M | I | I |
| E | S | S | S | I |
| F | S | S | I | I |
| G | S | S | S | I |
| H | I | I | I | M |

*FIG. 6*

METHODS AND APPARATUS FOR A DIRECTORY-LESS MEMORY ACCESS PROTOCOL IN A DISTRIBUTED SHARED MEMORY COMPUTER SYSTEM

This application is a continuation of U.S. patent application Ser. No. 08/671,303 now Pat. No. 5,873,117, filed Jul. 1, 1996, entitled "Methods and Apparatus for a Directory-Less Memory Access Protocol in a Distributed Shared Memory Computer System".

BACKGROUND OF THE INVENTION

The present invention relates to methods and apparatus for facilitating efficient communication in a computer network. More specifically, the present invention relates to improved techniques that permit nodes of a computer network to access the network's distributed shared memory (DSM) in an efficient manner.

Computer networks having distributed shared memories (DSM) are known in the art. For discussion purposes, FIG. 1 illustrates a computer network 10 having a network infrastructure 12 (NI). Four network nodes 100, 102, 104, and 106 are shown coupled to network infrastructure 12. Through network infrastructure 12, nodes 100–106 may communicate among one another to share programs, data, and the like. Of course, the number of nodes provided per network 10 may vary depending on needs, and may include any arbitrary number of nodes.

Within each network node, there exists a memory module whose memory blocks may be accessed by other network nodes. In general, each memory block in the network has an unique address that allows it to be uniquely addressed. The union of all memory blocks in the nodes of network 10 comprises the distributed shared memory (DSM). It should be noted, however, that although the memory blocks of the DSM may be accessed by any network node, a given memory block is typically associated with some home node in network 10.

For the purposes the present invention, network infrastructure 12 may have any configuration and may be implemented by any protocol. Generally, network infrastructure 12 possesses the ability to correctly deliver a message from one node to another according to the destination address associated with that message. One exemplar network infrastructure is Sequent Numa-Q, available from Sequent Computer Systems, Inc. of Beaverton, OR.

Each of network nodes 100–106 may be as simple as a computer having a single processor that is coupled to its own memory module via a memory cache. A network node may also be as complicated as a complete bus-based multi-processor system or even a multi-processor network. In the latter case, a node may include multiple processors, each of which is coupled to its own memory module and memory cache, as well as to the memory distributed among other nodes in the network. For ease of illustration, the invention will be described herein with reference to a node having a single processor. It should be apparent to those skilled in the art given this disclosure that the principles and techniques disclosed herein are readily extendible to nodes having multiple processors.

In the prior art, the network nodes typically communicate among themselves using a bus-based approach or a directory protocol. By way of example, FIG. 2 is a schematic of a computer network, including exemplar nodes 100a and 100b, for implementing one version of the prior art bus-based protocol. In node 100a of FIG. 2, processor 200a is coupled to a memory module 204a, e.g., a dynamic random access memory module, via a memory cache 202a, which is typically implemented using some type of fast memory, e.g., static random access memory (SRAM). Memory module 204a may divided into memory blocks, and memory cache 202a serves to expedite access to the memory blocks of memory module 204a by holding a copy of the requested memory block, either from its own node or another node in the network (such as node 100b), in its fast memory circuits. Through a network interface (included in each node but not shown to simplify illustration), node 100a may communicate with node 100b as well as other nodes in the network via a bus-based network infrastructure, e.g., bus 206, to gain access to the distributed shared memory (DSM), which is distributed in the nodes of the network.

In a bus-based computer network, a memory request by a given node is typically broadcasted on the common bus to other nodes so that the request may be seen by all other nodes in the network. For example, if processor 200a of FIG. 2 needs to access a memory block residing in another memory module of another network node, it typically broadcasts on the common bus its memory access request. All the nodes on a network would receive the same request, and the node whose memory address ranges match the memory address provided in the memory access request then responds.

This broadcast technique works adequately for relatively small computer networks. As computer networks grow larger and/or become more physically dispersed, the bus-based approach has several difficulties. For example, as the bus grows larger to accommodate more nodes, it is desirable to operate the bus at a higher speed since each node generally needs to access the bus for a period of time to execute its transactions. Operating a large bus at a high frequency is difficult because as busses become larger, they become electrically longer and electrical concerns, e.g., capacitance, may substantially limit their operating frequency. Consequently, the bus-based approach is generally unsuitable for large or physically dispersed computer networks.

Further, a bus-based approach requires the provision of an arbiter circuit, i.e., the mechanism to enforce a natural ordering of transactions by the various nodes of the computer network. The arbiter circuit needs to ensure that memory access requests from various network nodes are properly ordered to avoid race conditions. The use of arbiter circuits and an arbitration scheme represents an additional layer of complexity, thereby adding to the expenses in the implementation and maintenance of computer networks.

Further, the large number of parallel messages that need to be sent in a bus-based system from the requesting node to all the nodes in a network represent an extra burden on the bus's bandwidth. This is because, as mentioned earlier, the requesting node must poll every node in the network and require each node to analyze the request to either ignore the request, or to respond. The extra work required of the other nodes in the network represents extra delay and additional processing that the network nodes must perform.

The directory technique represents an attempt to implement a computer network in which natural broadcast is not necessary, i.e., a transaction or a request from a node does not need to be broadcasted in a parallel manner on a common bus to all other nodes in the network. FIG. 3A illustrates, for discussion purposes, a computer network node 100 for implementing the directory protocol. With reference to FIG. 3A, there is shown a directory 210 which may be implemented as a data structure in memory and contains directory entries, each of which corresponds to a unique memory block of the memory module in node 100. For example, there is shown in directory 210 a directory entry 212, which corresponds to a memory block 208 in a memory module 204. In every node, there is typically provided a directory containing directory entries for the memory blocks of its memory module. The union of all directory entries in a given node represents the directory for that node. There is also shown in FIG. 3A a network interface 206, representing the circuit for connecting a node to its outside world, e.g., to the network infrastructure.

In the directory protocol, each node in the network, e.g., each of nodes 100–106, must know whether it has an exclusive copy of a block of memory (a modifiable or M-copy), a shared, read-only copy (a S-copy), or it does not have a copy of that memory block (an invalid or I-copy). When a node has an M-copy of the block, it is said to have an exclusive copy and can modify this copy to cause it to be potentially different from its counterpart in the memory module of its home node. When any node in the computer network possesses an M-copy of memory block 208, for example, all other nodes give up their copies, i.e., possessing only I-copies of memory block 208.

Whereas only one node may have an M-copy of a memory block, multiple nodes may possess shared copies (S-copies). A node having a S-copy essentially has a read-only copy, i.e., it cannot modify the memory block's contents. S-copies of a memory block may exist contemporaneous with I-copies of the same memory block in a network. S-copies of a memory block cannot, however, co-exist with any M-copy of the same memory block. In general, a node is said to have a valid copy of a memory block when it has either a S-copy or an M copy of said memory block.

In one implementation, a node may request to cache an exclusive copy (M-copy) by issuing an RTO request, where RTO represents "read-to-own." A node may issue an RTS request to request to cache a shared copy of a memory block, where RTS represents "read-to-share." A node may also request to write back the exclusive M-copy of a memory block by issuing a WB request, where WB stands for write-back.

As stated, every node in the computer network knows which kind of copy of memory block 208 it currently possesses. Thus, this knowledge regarding memory block 208 is distributed among the nodes of the network. In accordance with the directory protocol, the same knowledge regarding memory block 208 is also centralized at the home node of memory block 208, i.e., in directory entry 212 of directory 210.

To simplify illustration, the discussion herein will be made with reference to the four-node network of FIG. 1 although, as noted earlier, a computer network may contain any arbitrary number of nodes. For a four-node network, a directory entry 212 may include, as shown in FIG. 3B, directory states 220–226, representing the copies of memory block 208 that exist in respective nodes 100–106. According to the directory entry of FIG. 3B, node 100 currently has an exclusive M-copy of memory block 208 (shown by M state 220), and all other nodes 102, 104, and 106 of the computer network have invalid I-copies of memory block 208 (shown by I states 222, 224, and 226).

According to the directory entry of FIG. 3 C, node 104 now has the exclusive M-copy of memory block 208 (shown by M-state 234), and all other nodes 100, 102, and 106 of the computer network have I-copies of memory block 208 (shown by I states 230, 232, and 236). In the directory entry of FIG. 3D, nodes 100, 102, and 104 have shared S-copies of memory block 208 (shown by S states 240, 242, and 244), while node 106 does not have a copy of memory block 208 (shown by I state 246).

Further, there is provided a pending flag 213 with each directory entry 212. The pending flag is set whenever there is a pending transaction pertaining to a particular memory block. Pending flag 213 remains set until the transaction is completed, at which time it is reset to permit a subsequent transaction pertaining to the same memory block to be serviced.

In accordance with the prior art directory protocol, when any node of computer network 10 requests an exclusive or shared copy of a memory block, the memory access request is routed by network infrastructure (NI) 12 to the home node, i.e., the node containing the memory address space into which the address of the requested memory block maps. For the sake of discussion, assume that memory block 208 of node 100 has been requested by another network node. Once the home node, i.e., node 100, receives the request, it consults directory entry 212, which is associated with memory block 208, to ascertain the current state of memory block 208 at the various nodes of the network.

If the current state of memory block 208 is as shown in FIG. 3B, for example, and node 104 subsequently requests an exclusive M-copy of memory block 208, the request will be sent by network infrastructure 12 to network interface 206 of home node 100 (see FIG. 3A). When node 100 receives the RTO request from node 104, it consults its directory 210 and determines from directory entry 212 (whose states are shown in FIG. 3B) that home node 100 currently has the exclusive M-copy of memory block 208. Since home node 100 already has the only valid copy of memory block 208 in the network, home node 100 may immediately send a copy of memory block 208 to requesting node 104 and updates its directory entry 212 to correspond to that shown in FIG. 3C, i.e., reflecting the fact that node 104 now has the exclusive M-copy of memory block 208, the copy at node 100 has been downgraded to an I-copy, and nodes 102 and 106 continue to have S-copies. Once requesting node 104 gets its M-copy, it sends a completion message to home node 100 to reset the pending field of directory entry 212 to allow subsequent transactions pertaining to memory block 208 to be serviced.

As a further example, if node 102 subsequently issues an RTS transaction for memory block 208 to request a shared S-copy, the RTS request by node 102 will be forwarded by network infrastructure 12 to the home node of memory block 208, i.e., node 100. Assuming that the current state of memory block 208 is as shown in FIG. 3C, home node 100 may then ascertain from directory entry 212 that node 104 currently has the only exclusive copy of memory block 208. It then issues a request to node 104, asking node 104 to send a copy of memory block 208 to requesting block 102. Home node 100 may also request that node 104 update its copy from an M-copy to a S-copy. At the same time, home node 100 may update its own directory entry 212 to reflect the new state of memory block 208 at node 104. Once node 102 receives a copy of memory block 208, its state in directory entry 212 is updated from an I-copy to a S-copy (state 242).

In some implementation, e.g., memory reflection technique, whenever there is a S-copy in any node of the network, the home node, e.g., node 100 in this example, also has a shared copy of that memory block (S-copy). In this manner, the home node can quickly service the next request for a shared copy without having to request another node in the network to forward a shared copy to the subsequent requesting node. In accordance with such an implementation, home node 100 also receives an S-copy of memory block 208 and state 240 is upgraded to a S state in FIG. 3D from the I state (state 230) of FIG. 3C.

Note that only three states (M/S/I) and three types of transactions (RTO/RTS/WB) are discussed herein to simplify illustration. Of course, there may exist other states, transactions and variations on the implementation. It should also be noted that the presence of the directory eliminates the need to broadcast a memory access request from one node to all nodes of the network since the home node can always consult its directory entries to determine the exact node from which a copy may be obtained and can directly ask that node to forward a copy to the requesting node. If necessary, the home node can directly ask another node in the network to modify its copy of the requested memory block to conform to the protocol requirements, e.g., to downgrade to an I-copy when there is an M-copy elsewhere in the network.

The use of the pending flag, e.g., bit 213 of FIG. 3A, eliminates the need for any natural ordering in the network. In other words, the use of the pending flag ensures that the current transaction for a given memory block is completed before the next transaction concerning that memory block is serviced. If multiple transactions regarding the same memory block is received by the home node, they may be, for example, queued in the order of their receipt inside network interface circuit 206 to be serviced in turn.

Although the directory protocol eliminates the need for natural ordering and natural broadcasting in a computer network when servicing memory access requests, the requirement of a directory entry for every memory block in a node represents a significant memory overhead. This memory overhead can become quite significant for nodes having a large number of memory blocks. Further, the directory protocol requires additional work on the part of the home node to track the states of its memory blocks in all nodes of the computer network. This requirement represents an additional layer of complexity in the implementation and management of computer networks.

In view of the foregoing, what is desired are methods and apparatus that permit nodes of a computer network to access the network's distributed shared memory in an efficient manner.

SUMMARY OF THE INVENTION

The invention relates, in one embodiment, to a method in a computer network having a first plurality of nodes coupled to a common network infrastructure and a distributed shared memory distributed among the first plurality of nodes for permitting a first node of the computer network to access a copy of a memory block having a home node different from the first node in the computer network. The computer network has no natural ordering mechanism and natural broadcast for servicing memory access requests from the plurality of nodes. The home node has no centralized directory for tracking states of the memory block in the plurality of nodes.

The method includes the step of receiving via the common network infrastructure at the home node from the first node a first memory access request for the memory block. There is also included the step of marking a status of the memory block as pending to signify that an access for the memory block is in progress. The status while pending renders the home node incapable of servicing other memory access requests pertaining to the memory block.

Additionally, there is included the step of sending, if the home node does not have a first valid copy of the memory block, a request from the home node to a second plurality of nodes in the computer network to request a second node in the computer network to send a second valid copy of the memory block to the first node. The second plurality of nodes represents the first plurality of nodes excepting the first node and the home node. There is included the step of marking, upon receiving an acknowledgment from the first node acknowledging that the first memory access request has been fulfilled, the status of memory block as non-pending to signify that no access request pertaining to the memory block is in progress. The marking of the status of the memory block as non-pending permits the other memory access requests pertaining to the memory block to be serviced.

In another embodiment, the invention relates to an apparatus for permitting a first node of a computer network to access a copy of a memory block of a distributed shared memory of the computer network having a first plurality of nodes. The computer network has no natural ordering mechanism and natural broadcast for servicing memory access requests from the plurality of nodes. The memory block has a home node different from the first node in the computer network. The home node has no centralized directory for tracking states of the memory block in the first plurality of nodes.

The apparatus includes means for receiving via a common network infrastructure of the computer network at the home node from the first node a first memory access request for the memory block. There is also included means for marking a status of the memory block as pending to signify that an access for the memory block is in progress. The status while pending renders the home node incapable of servicing other memory access requests pertaining to the memory block.

There is also included means for sending, if the home node does not have a first valid copy of the memory block, a request from the home node to a second plurality of nodes in the computer network to request a second node in the computer network to send a second valid copy of the memory block to the first node. The second plurality of nodes represents the first plurality of nodes excepting the first node and the home node. Additionally, there is included means for marking, upon receiving an acknowledgment from the first node acknowledging that the first memory access request has been fulfilled, the status of the memory block as non-pending to signify that no access request pertaining to the memory block is in progress. The non-pending status of the memory block allows the other memory access requests pertaining to the memory block to be serviced.

These and other advantages of the present invention will become apparent upon reading the following detailed descriptions and studying the various figures of the drawings.

BRIEF DESCRIPTION OF THE DRAWINGS

FIGS. 3B–3D show different directory entries corresponding to the directory states of a given memory block at various times in the nodes of the computer network of FIG. 1.

FIG. 6 illustrates, for discussion purposes and responsive to various memory access requests, the states of a memory block in the nodes of the network of FIG. 1.

DETAILED DESCRIPTION OF THE PREFERRED EMBODIMENTS

An invention related to a directory-less protocol is described for permitting nodes of a computer network to access the network's distributed shared memory in an efficient manner. In the following description, numerous specific details are set forth in order to provide a thorough understanding of the present invention. It will be obvious, however, to one skilled in the art, that the present invention may be practiced without some or all of these specific details. In other instances, well known structures and process steps have not been described in detail in order not to unnecessarily obscure the present invention.

In accordance with one aspect of the present invention, there are provided improved apparatus and methods for servicing memory access requests by the network nodes for memory blocks of the network's distributed shared memory. The memory access requests may be serviced without requiring a natural ordering mechanism, such as an arbiter, and without requiring a natural broadcast to all nodes in the computer network for every memory access request. The elimination of the natural ordering mechanism reduces the complexity of the network infrastructure. The elimination of the requirement for a natural broadcast to all network nodes for every memory access request advantageously reduces the number of transactions the network infrastructure must handle, thereby improving the bandwidth of the network.

In contrast with the prior art directory protocol, the present directory-less invention does not require the implementation and maintenance of node directories in the network nodes. The elimination of a centralized directory at each node advantageously reduces the memory overhead as well as the complexities involved in the directory protocol.

Figure 1:
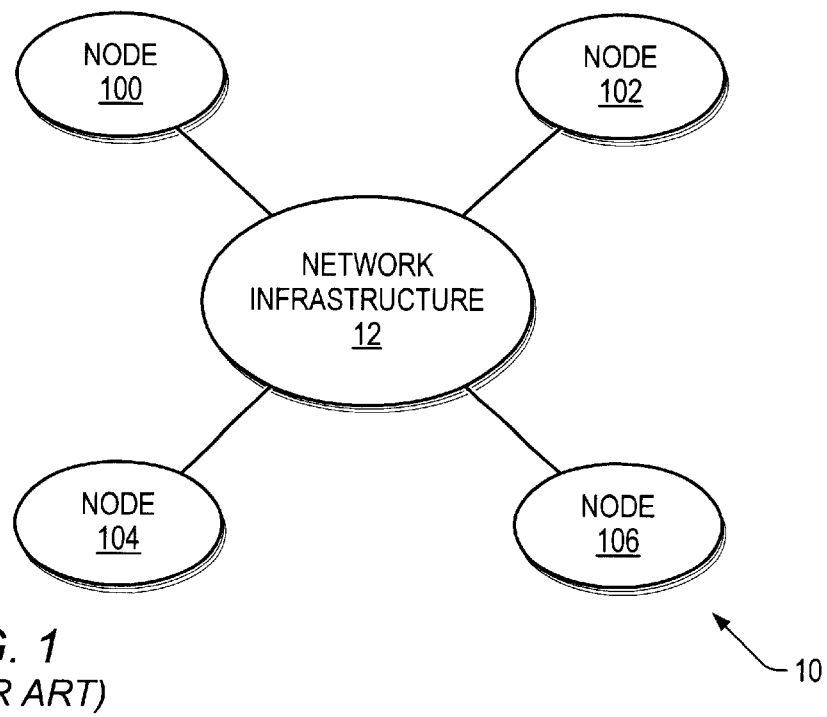
FIG. 1 illustrates, for discussion purposes, a computer network having a plurality of nodes and a network infrastructure.
Figure 2:
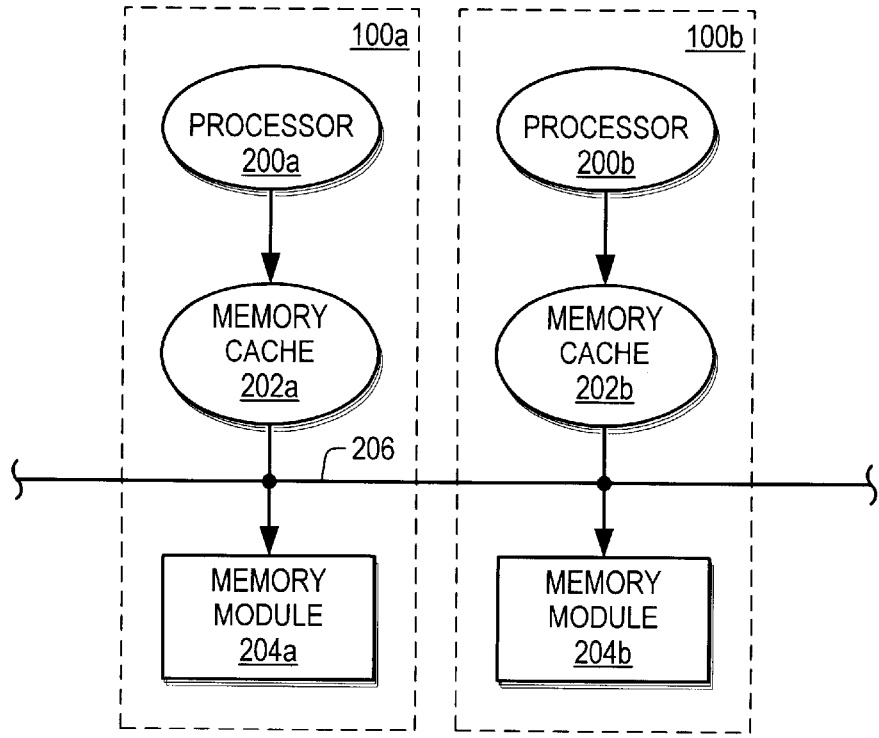
FIG. 2 is a schematic of a computer network node for implementing one version of the prior art bus-based protocol.
Figure 3A:
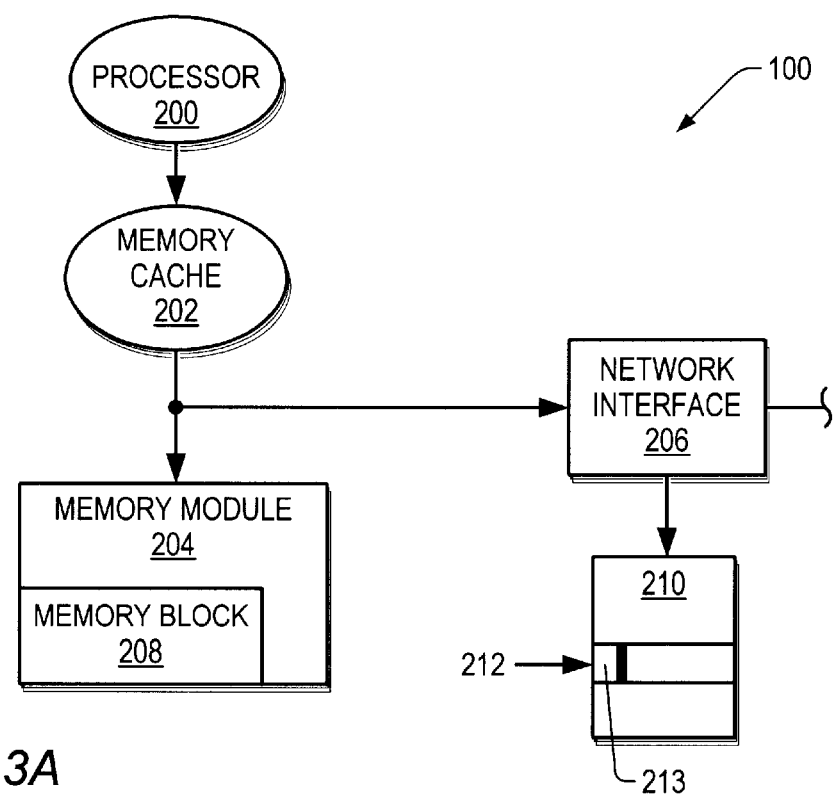
FIG. 3A illustrates, for discussion purposes, a computer network node for implementing the prior art directory protocol.
Figure 4:
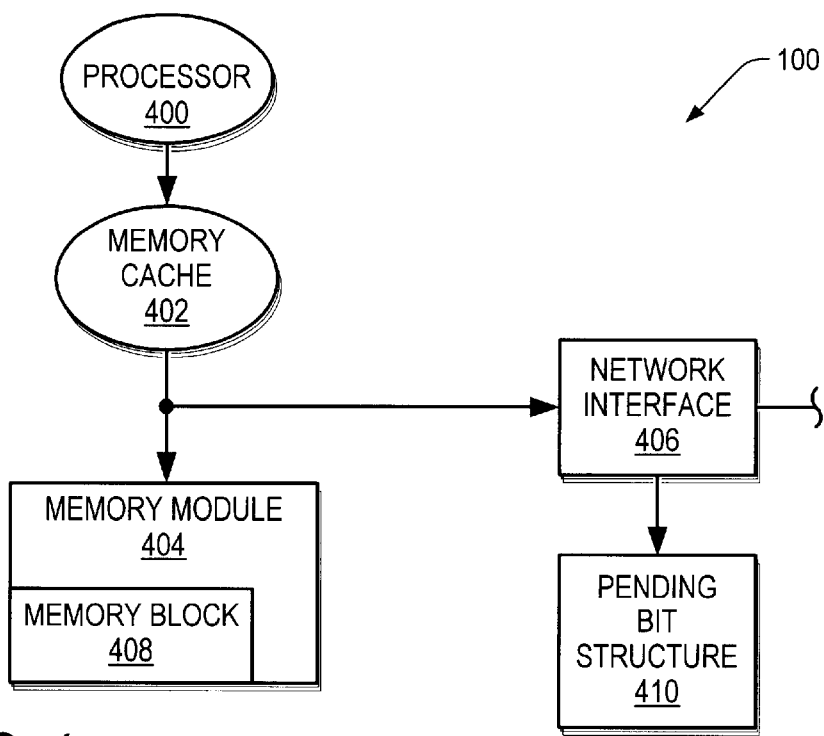
FIG. 4 shows, in accordance with one aspect of the present invention, a schematic of a computer network node suitable for implementing the directory-less protocol.

FIG. 4 shows, in accordance with one aspect of the present invention, a schematic of a computer network node, such as node 100 of FIG. 1, that is suitable for implementing the directory-less protocol of the present invention. In FIG. 4, node 100 is shown having a processor 400. Processor 400 is coupled to a memory cache 402, which is employed to cache requested memory blocks. The memory blocks cached by memory cache 402 represent memory blocks requested by node 100. The home node of a cached memory block may be the same node as the node on which the directory is kept or another node in the network.

Both memory cache 402 and memory module 404 are coupled to a network interface 406. Network interface 406 represents the circuit that allows node 100 to communicate with the network infrastructure, such as network infrastructure 12 of FIG. 1. Memory module 404 typically has an address range that is different from the address ranges associated with other memory modules in the network. The union of all memory modules 404 in a network make up the distributed shared memory (DSM). Memory module 404 further contains all the memory blocks of a node. When the network is quiescent, every memory block has a home node. As mentioned earlier, node 100 can be as simple as a single processor having a cache or as complicated as a complete bus-based multiprocessor system.

To implement the directory-less protocol, there is provided, in accordance with one aspect of the present invention, a pending flag structure 410. In one embodiment, pending flag structure 410 is coupled to network interface 406. Pending flag structure 410 represents the memory structure for storing the flag that signifies whether a particular memory block, e.g., memory block 408, is currently being accessed by a network node and should not be read or written to by another node. When the pending flag is set, access to the associated memory block is prohibited to other network nodes. When the pending flag is reset, the associated memory block is available for servicing the next transaction that requests it.

Figure 5A:
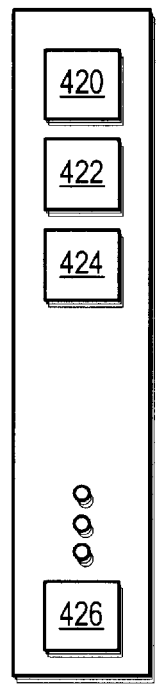
FIGS. 5A and 5B illustrate, in accordance with different aspects of the present invention, the organization of a pending flag structure.

In one embodiment, pending flag structure 410 may be implemented by providing a flag (which may be one bit although multiple bits may be employed as well) for every memory block of memory module 404. Some predefined relationship between the addresses of the memory blocks in memory module 404 and the addresses of flags in the pending flag structure may permit node 100 to ascertain the unique memory block associated with each flag. By way of illustration, when the address in memory module 404 is increased by four, the address in the pending flag structure may increase by, for example, one. FIG. 5A illustrates this implementation wherein pending flags 420–426 map to the memory blocks of memory module 404, using some conventional mapping technique.

Figure 5B:
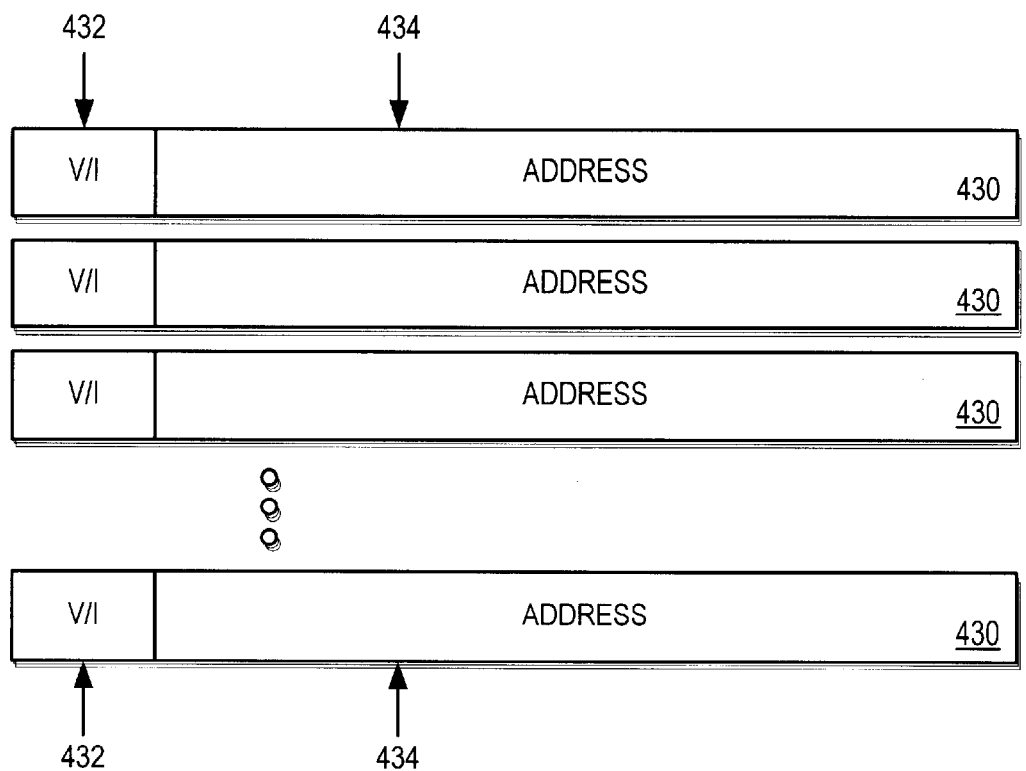

In another aspect of the present invention, it is not required that each memory block has an associated pending flag in pending flag structure 410. In accordance with this aspect, which is illustrated in FIG. 5B, each pending structure entry 430 in pending flag structure 410 is implemented by a valid flag field 432 and an address field 434. When a memory block is "pending," its address is entered into address field 434 of pending structure entry 430 and the valid flag in valid flag field 432 is set. The number of pending structure entries 430 in pending flag structure 410 may be smaller than the number of memory blocks in memory module 404 to reduce the memory overhead. The implementation of FIG. 5B is advantageous for network nodes that have a relatively large memory module 404 since only a small number of memory blocks is typically cached at any given time and the number of pending structure entries 430 may be kept relatively small. The number of pending structure entries 430 may vary greatly from system to system, depending on the number of memory blocks expected to be cached at any given point in time (which number may be statistically determined for a particular network).

Figure 7:
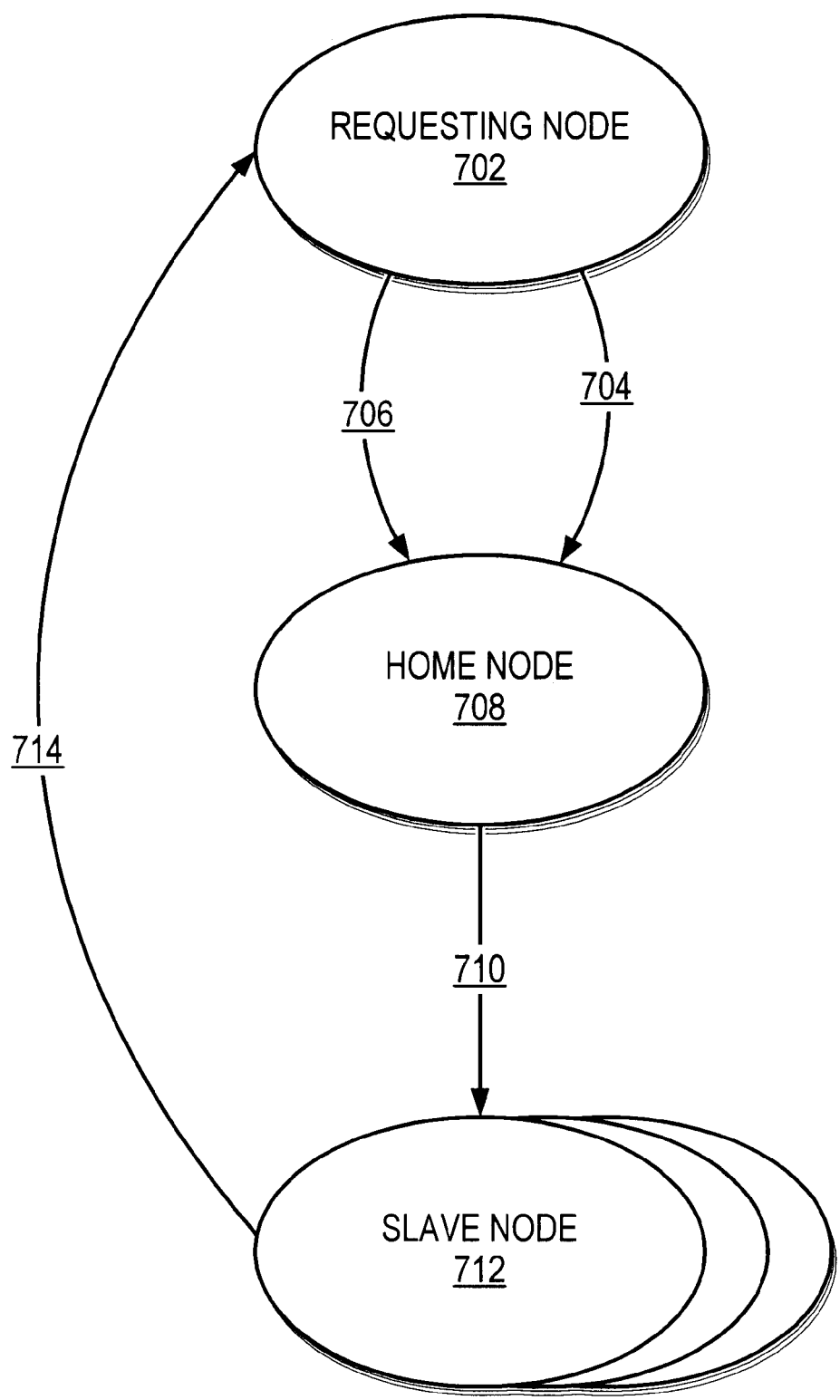
FIG. 7 is a state diagram illustrating the various communication paths between a requesting node, a home node, and a slave node in servicing memory access requests.

The operation of the present directory-less invention may be best illustrated with reference to the examples of FIG. 6 and the state diagram of FIG. 7. In FIG. 6, there are shown in rows A–H the states for memory block 408 of node 100 of FIG. 4 in the four nodes of the network. It should be borne in mind that although a single memory block 408 is discussed in detail herein to simplify the illustration, caching is typically performed on a plurality of memory blocks It should also be borne in mind that the number of nodes in a network may be varied according to needs. Further, the matrix of FIG. 6 is shown herein for discussion purposes only. In the directory-less protocol, it is not necessary to create and maintain a centralized matrix in computer memory.

In row A, node 100 is shown to have an exclusive M-copy of memory block 408 (M state in row A, column 100). By definition, all other network nodes must have invalid copies of memory block 408 (shown by state I in row A, columns 102–106). Incidentally, the M-copy of memory block 408 may currently be cached by the memory cache in its home node 100 or may reside in the memory module of the home node.

Transaction #1 (Row A to row B of FIG. 6): Suppose node 104 now desires an exclusive M-copy of memory block 408, which, as shown in row A, currently resides at its home node 100. With reference to FIG. 6, node 104 represents the requesting node 702, while node 100 represents the home node for memory block 408, which is shown in FIG. 6 as home node 708. Slave node 712 represents the node where the copy of memory block 408 currently resides. In row A, slave node 712 happens to be the same node as the home node, i.e., node 100.

The RTO request from node 104 (requesting node 702 in this first transaction) is forwarded to home node 100 (node 708) via path 704. The forwarding of the RTO transaction from the requesting node to the home node is typically handled by network infrastructure 12 utilizing the address provided with the RTO request. The network infrastructure 12 knows where the home node for a particular memory block is by, for example, mapping its address to the address ranges of the various nodes. When home node 100 (node 708) receives the RTO message, it sets the pending flag associated with the requested memory block 408. Further, it knows that it has an exclusive M-copy of memory block 408, and can therefore infer that all other nodes must have invalid copies of memory block 408. Since it is also the node at which the copy resides (slave node 712), node 100 may be thought of in FIG. 7 as encompassing both home node 708 and slave node 712.

Node 100 (home node 708/slave node 712), then sends a copy of requested memory block 408 via path 714 to requesting node 104 (node 702). Upon receiving a copy of memory block 408, requesting node 104 (node 702) then updates its copy to an exclusive M-copy and sends a confirmation message via path 706 to home node 100 (node 708). The receipt of the confirmation message by home node 100 (node 708) permits the pending flag associated with memory block 408 to be reset, thereby allowing subsequent transactions involving memory block 408 to be serviced. As shown in transaction #1, the use of the pending flags and explicit messages between the requesting node, the home node, and the slave node (via paths 704, 706, 710, and 714) eliminates the need for a network-wide broadcast to service this RTO transaction #1.

Further, the use of the pending flag eliminates the requirement of a natural ordering mechanism, since transactions can be queued by the receiving home node in the order in which they are received and serviced in that order whenever the pending flag becomes reset. As can be appreciated by those skilled in the art, the number of messages sent in the network is advantageously the same for transaction #1 in the directory-less protocol as in the implementation involving the directory protocol, i.e., there is no performance penalty involved in employing the directory-less protocol for transaction #1. Advantageously, however, the directory as well as its attendant complexities and memory/transaction overhead is not required in the inventive directory-less protocol.

Transaction #2 (Row B to row D): In transaction #2, node 102 acts as the requesting node and requests an exclusive copy of memory block 408 by issuing an RTO transaction. The RTO transaction is forwarded by network infrastructure 12 to the home node 100 of memory block 408, i.e., node 708 in transaction #2, via path 704 and causes home node 100 to set the pending flag associated with memory block 408.

Since node 100 only knows that it has an invalid copy of memory block 408 (row B, column 100) and it has no directory entry to consult in the directory-less protocol, node 100 does not know where in the network a valid copy of memory block 408 may be found. However, node 100 needs to request the node that currently has the copy of memory block 408 forward that copy to requesting node 102. Consequently, home node 100 (node 708) sends a request via path 710, in parallel in one embodiment, to all other nodes in the network except the requesting node (node 102 in transaction #2), and itself (node 100). In this case, the number of messages that are sent out through network interface 12 from the home node is therefore Total-2 where Total represents the total number of nodes in computer network 10.

If a node receiving the message from home node 100 cannot respond to the request to forward a copy of memory block 408 to the requesting node, i.e., it does not have a valid copy of memory block 408, that receiving node merely ignores the request from the home node. In this transaction, node 104, which currently has the only exclusive copy of memory block 408 (as shown in row B), responds via path 714 to the requesting node 102 (node 702 in transaction #2). Node 104 is the slave node in this transaction since it represents the node where a valid copy of the requested memory block currently resides. Node 104 (slave node 712) downgrades its copy from an exclusive M-copy to an invalid I-copy, since by definition, if one node in the computer network has an exclusive M-copy, i.e., requesting node 102, all other nodes must have invalid I-copies.

When the requesting node 702 (node 102 in transaction #2) receives a copy of memory block 408, it internally notes that it now has an exclusive M-copy (row D, column 102) and acknowledges via path 706. When home node 100 (node 708) receives the acknowledgment message from the requesting node via path 706, it updates its copy, if necessary (it turns out to be unnecessary in this case), and resets the pending flag associated with memory block 408 so that other transactions involving memory block 408 may be serviced.

As can be appreciated from the discussion regarding transaction #2, when the home node does not have the exclusive M-copy of a memory block and receives an RTO request pertaining to that memory block, the number of messages it must send via network infrastructure 12 to request another node to facilitate the forwarding of a copy of the requested memory block to the requesting node is at least Total-2. Of the messages sent, the number of messages that is "wasted," i.e., ignored by the receiving slave nodes, is Total-3 (since one of the receiving nodes is the node that can respond by sending a valid copy of memory block 408 to the requesting node). Thus, in transaction #2, the number of messages that must be sent by the home node via network infrastructure 12 to service the RTO request may be greater than in the case of the directory protocol. For relatively small networks that have a relatively small number of nodes, the number of messages wasted may, however, be justified by the substantially simpler implementation of the directory-less protocol.

Transaction #3 (Row D to Row A): In transaction #3, node 102, which had an exclusive M-copy, requests to write back the content of memory block 408 back to home node 100. A node may want to write back a memory block it earlier cached for a variety of reasons, e.g., it wants to cache another memory block and does not have room in its memory cache. With reference to FIG. 6, requesting node 102 (node 702), sends a write-back (WB) transaction to the network infrastructure. The network infrastructure then routes this request to the home node of memory block 408, i.e., node 100 via path 704. Upon receiving this WB request, home node 100 (node 708) sets the pending flag associated with memory block 408.

Although home node 100 only has an invalid I-copy of memory block 408 (as shown in row D, column 100 of FIG. 6), it can infer that since node 102 requests a write-back, node 102 must have the exclusive M-copy of memory block 408. Consequently, home node 100 (node 708) sends a message via path 710 to slave node 712 to request it to write back. Slave node 712 represents the node currently having the copy of memory block 408, which happens to be the same node as requesting node 102 in this write back transaction. Consequently, requesting node 702 and slave node 712 may be treated as a single entity in this transaction. Node 102 (slave node 712/requesting node 702) then sends a copy of memory block 408 via path 706 to home node 100 (node 708) where the content of memory block 408 is written into home node 100 (node 708). Once the content of memory block 408 is written back, the pending flag associated with memory block 408 may then be reset.

In transaction #3, a possible race condition exists if the write-back request from node 102 is delayed in arriving at home node 100, and meanwhile another node in the network issues a transaction concerning memory block 408, which gets serviced before the write back request from requesting node 102 arrives at home node 100. In this situation the home node 100, upon receiving the later-issued-but-sooner-arrived transaction request may, seeing that the pending flag associated with memory block 408 has not been set, proceed to service this later issued request.

The servicing of this later-issued request may cause the copy of memory block 408 to be moved from node 102. When the write-back request from node 102 finally arrives at home node 100 and is serviced, node 102 may no longer have an exclusive M-copy of memory block 408. In accordance with one aspect of the present invention, when a home node, e.g., node 100, receives a write-back request, it can simply respond via path 710 to the requesting/slave node to ask the requesting/slave node to write-back only if the requesting/slave node still has an exclusive M-copy of the memory block. Otherwise, the home node simply ignores the received write-back request. Advantageously, by responding to the node requesting the write-back in this manner, possible race conditions are advantageously avoided.

Transaction #4: (Row D to Row E). Node 104 wants a shared, read-only copy of memory block 408 and issues an RTS (read-to-share) request to the network infrastructure to request a read-only copy of memory block 408. Network infrastructure 12 forwards the RTS request via path 704 from requesting node 104 (node 702), to home node 100 (node 708), which causes the pending flag associated with memory block 408 to be set.

Home node 100 only knows that it has an invalid I-copy (row D, column 100). Without the knowledge of which node in the network has a shared S-copy or an exclusive M-copy, home node 100 (node 708) must broadcast a request to all remaining nodes in the network to ask the node which has an M-copy to downgrade itself to a S-copy and forward a copy of requested memory block 408 to requesting node 104 (node 702). The number of requests sent via path 710 from home node 100 (node 708) to the remaining nodes in the computer network, is again Total-2 (there is no need to send a request to the home node or the node that requests a copy of memory block 408).

In this case, node 102 represents the slave node which previously had the exclusive M-copy (row D, column 102). Slave node 102 (node 712) then sends a copy of memory block 408 to requesting node 104 (node 702), and simultaneously downgrades the copy it has from an exclusive M-copy to a shared S-copy (from row D, column 102 to row E, column 102). Upon receiving a copy of memory block 408, requesting node 104 (node 702) then sends an acknowledgment message to home node 100 (node 708) which resets the pending flag.

Transaction #5 (Row F to Row G) In one embodiment, whenever there is a shared, read-only S-copy anywhere in the node, the home node may also retain a shared, read-only S-copy. The shared, read-only S-copy may be sent to home node 708 from, for example, the requesting node 502 (after it has received a copy of the requested memory block from the slave node), along with the acknowledgment message in path 706. Since the home node has a shared, read-only S-copy, it can advantageously service a subsequent RTS request from another node in the computer network without having to ask another node to forward its copy to the requesting node. This transaction is illustrated as transaction #5 when the states of memory block 408 change from those of row F to row G of FIG. 6.

In transaction #5, nodes 100 and 102 currently have shared, read-only S-copies of memory block 408, and nodes 104 and 106 have invalid I-copies of the same memory block. Node 104 now wants a shared, read-only S-copy of memory block 408 and issues an RTS request which arrives at home node 100 (node 708) via path 706 and causes the pending flag associated with memory block 408 to be set. Since home node 100 (node 708) already has a shared S-copy, it does not need to request a copy of memory block 408 from any other node in the network, and in fact, does not care what other copies may exist on the nodes of the network. Consequently, home node 708 and slave node 712 may be thought of as the same entity, i.e., node 100, and may respond via path 714 to requesting node 104 (node 702) with a copy of memory block 408. Upon receiving a copy of memory block 408, requesting node 104 (node 702) acknowledges by sending a message via path 706 to home node 100 (home node 708/slave node 712), causing the pending flag associated with memory block 408 to be reset.

Transaction #6: (Row G to Row H) In transaction #6, nodes 100, 102, and 104 have shared, read-only S-copies while node 106 has an invalid I-copy of memory block 408. Subsequently, node 106 (node 702 in FIG. 6) desires an exclusive M-copy and issues an RTO transaction to the network infrastructure 12. Network infrastructure 12 forwards the RTO request to the home node of memory block 408, i.e., node 100, via path 704, which causes the pending flag associated with memory block 408 to be set. Since home node 100 (node 708) only knows that it has a shared, read-only S-copy (row G, column 100), and there is no centralized directory in the home node in accordance with the directory-less protocol for it to consult, home node 100 (node 708) must send messages to other nodes in the network to request them to downgrade their copies of memory block 408 to invalid I-copies if they previously had shared, read-only S-copies. Again, the number of messages that must be sent via path 710 to other nodes in the network is Total-2 (since there is no need for home node 100 to send a message to itself or to the requesting node).

Further, node 100 may treat itself as a slave node since a valid, albeit shared, copy of memory block 408 currently resides on node 100. Consequently, home node 708 and slave node 712 may be thought of as the same entity, i.e., node 100. Home node 100 (home node 708/slave node 712) then sends a copy of memory block 408 via path 714 to requesting node 106 (node 702).

In one embodiment, home node 100 (home node 708/slave node 712) also sends to requesting node 106 (node 702) information regarding the number of slave nodes in the network to whom it has sent the request to downgrade. This information is kept by requesting node 106 (node 702). In this embodiment, each slave node to whom home node 708 sent the message (via path 710) to downgrade itself, also reports to requesting node 106 (node 702) via path 714 to acknowledge that it either has downgraded its copy from a shared S-copy to an invalid I-copy, or that it already has an invalid I-copy and does not need to downgrade further. Requesting node 106 (node 702) then counts the number of acknowledgments to ensure that all slave nodes in the network have acknowledged.

Once requesting node 106 (node 702) is satisfied that all the nodes that need to downgrade their copies have done so, requesting node 106 (node 702) then sends an acknowledgment message via path 706 to home node 100 (node 708) to allow home node 100 to reset the pending flag associated with memory block 408. Again, it should be noted that the use of these explicit messages and the pending flags advantageously eliminate the need to have an ordering circuit, such as an arbiter circuit, in the network to facilitate natural ordering.

As can be appreciated by those skilled in the art from the foregoing, the directory-less protocol has an advantage over the bus-based broadcast method since, in the worst case, the number of messages that need to be sent to the slave nodes is two less than the total number of nodes in the network. In one embodiment, messages in the directory-less protocol, when required to be sent from a home node to slave node(s), may be sent one at a time to specific slave nodes. This embodiment is in contrast to prior art snoop-type protocols or bus-based protocols wherein a broadcast from the home node to all other nodes via the common network infrastructure is typically performed.

In the best case, e.g., in transaction #1, the number of messages that are sent is as few as required in the directory protocol. Specifically, the inventive directory-less protocol advantageously eliminates the need to send a request to any other node in the network when the home node has an M-copy and responds to an RTO or an RTS request from another node. Further, no request to any other node in the network is necessary when the home node has a S-copy and responds to a RTS transaction request from another node.

Furthermore, the directory-less protocol represents an improvement over the directory protocol by eliminating the costs of implementing a directory, including the memory costs involved in implementing a directory structure for storing directory entries and the design costs involved in implementing and debugging directory logic.

While this invention has been described in terms of several preferred embodiments, there are alterations, permutations, and equivalents which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. In a computer network having a first plurality of nodes coupled to a common network infrastructure and a distributed shared memory distributed among said first plurality of nodes, a method for permitting a first node of said computer network to access a copy of a memory block having a home node different from said first node in said computer network, said home node having no centralized directory for tracking states of said memory block in said plurality of nodes other than said home node, said method comprising:

receiving via said common network infrastructure at said home node from said first node a first memory access request for said memory block; and if said home node does not have a first valid copy of said memory block, sending a request from said home node to a second plurality of nodes in said computer network to request a second node in said computer network to send a second valid copy of said memory block to said first node, said second plurality of nodes representing said first plurality of nodes excepting said first node and said home node.

2. The method of claim 1 further comprising the step of downgrading, upon said second node sending said second valid copy of said memory block to said first node, said second valid copy of said memory block at said second node from a copy of a first type to a copy of a second type different from said first type.

3. The method of claim 2 wherein said first memory access request is a request for an exclusive M-copy of said memory block, said copy of said first type represents an exclusive M-copy, and said copy of said second type represent an invalid I-copy.

4. The method of claim 2, further comprising upon receiving an acknowledgment from said first node acknowledging that said first memory access request has been fulfilled, marking said status of memory block as non-pending to signify that no access request pertaining to said memory block is in progress, thereby allowing said other memory access requests pertaining to said memory block to be serviced.

5. The method of claim 1 further comprising the step of sending said first valid copy of said memory block from said home node to said first node if said home node possesses said first valid copy of said memory block.

6. The method of claim 5 wherein said first memory access request represents a request for a shared S-copy of said memory block and said first valid copy of said memory block represents a shared S-copy of said memory block.

7. The method of claim 5 wherein said first memory access request represents a request for an exclusive M-copy of said memory block and said first valid copy of said memory block represents an M-copy of said memory block, said method further comprising the step of downgrading, upon said home node sending said first valid copy of said memory block from said home node to said first node, said first valid copy of said memory block at said home node from an M-copy of said memory block to an invalid I-copy of said memory block.

8. The method of claim 1, further comprising marking a status of said memory block as pending to signify that an access for said memory block is in progress, said status while pending renders said home node incapable of servicing other memory access requests pertaining to said memory block.

9. An apparatus for permitting a first node of a computer network to access a copy of a memory block of a distributed shared memory of said computer network having a first plurality of nodes, said memory block having a home node different from said first node in said computer network, said home node having no centralized directory for tracking states of said memory block in said first plurality of nodes other than said home node, said apparatus comprising:

means for receiving via a common network infrastructure of said computer network at said home node from said first node a first memory access request for said memory block; and if said home node does not have a first valid copy of said memory block, means for sending a request from said home node to a second plurality of nodes in said computer network to request a second node in said computer network to send a second valid copy of said memory block to said first node, said second plurality of nodes representing said first plurality of nodes excepting said first node and said home node.

10. The apparatus of claim 9, further comprising means for marking a status of said memory block as pending to signify that an access for said memory block is in progress, said status while pending renders said home node incapable of servicing other memory access requests pertaining to said memory block.

11. The apparatus of claim 10 further comprising a pending flag structure having pending structure entries for keeping said status.

12. The apparatus of claim 11 wherein the number of pending structure entries in said pending flag structure equals the number of memory blocks in a memory module at said home node, each of said pending flag entries comprising a single bit.

13. The apparatus of claim 11 wherein the number of pending structure entries in said pending flag structure is fewer than the number of memory blocks in a memory module at said home node, each of said pending flag entries comprising an address field and a valid flag field.

14. The apparatus of claim 11 whereas said second valid copy of said memory block is downgraded in said second node, upon said second node sending said second valid copy of said memory block from a memory cache of said second node to said first node, from a copy of a first type to a copy of a second type different from said first type.

15. The apparatus of claim 14 wherein said first memory access request is a request for an exclusive M-copy of said memory block, said copy of said first type represents an exclusive M-copy, and said copy of said second type represent an invalid I-copy.

16. The apparatus of claim 11 further comprising means for sending said first valid copy of said memory block from said home node to said first node if said home node possesses said first valid copy of said memory block.

17. The apparatus of claim 16 wherein said memory access request represents a request for a shared S-copy of said memory block and said first valid copy of said memory block represents a shared S-copy of said memory block.

18. The apparatus of claim 17 wherein said memory access request represents a request for an exclusive M-copy of said memory block and said first valid copy of said memory block represents an M-copy of said memory block, said method further comprising the step of downgrading, upon said home node sending said first valid copy of said memory block from said home node to said first node, said first valid copy of said memory block at said home node from an M-copy of said memory block to an invalid I-copy of said memory block.

19. The apparatus of claim 9, further comprising means for marking, upon receiving an acknowledgment from said first node acknowledging that said first memory access request has been fulfilled, said status of said memory block as non-pending to signify that no access request pertaining to said memory block is in progress, thereby allowing said other memory access requests pertaining to said memory block to be serviced.

20. In a computer network having a first plurality of nodes coupled to a common network infrastructure and a distributed shared memory distributed among said first plurality of nodes, a method for servicing a first memory access request by a first node of said computer network pertaining to a memory block having a home node different from said first node in said computer network, said home node having no centralized directory for tracking states of said memory block in said plurality of nodes other than said home node, said method comprising:

receiving via said common network infrastructure at said home node from said first node said first memory access request for said memory block; and if said home node does not have a first valid copy of said memory block, sending a request from said home node to a second plurality of nodes in said computer network to request a second node in said computer network to send said first valid copy of said memory block to said first node, said second plurality of nodes representing said first plurality of nodes excepting said first node and said home node, said first valid copy of said memory block representing a valid copy that is capable of servicing said first memory access request.

21. The method of claim 20 further comprising the step of downgrading, upon said second node sending said first valid copy of said memory block from a memory cache of said second node to said first node, said first valid copy of said memory block at said second node from a copy of a first type to a copy of a second type different from said first type.

22. The method of claim 21 wherein said first memory access request is a request for an exclusive M-copy of said memory block, said copy of said first type represents an exclusive M-copy, and said copy of said second type represent an invalid I-copy.

23. The method of claim 20 further comprising the step of sending said first valid copy of said memory block from said home node to said first node if said home node possesses said first valid copy of said memory block.

24. The method of claim 23 wherein said first memory access request represents a request for a shared S-copy of said memory block and said first valid copy of said memory block represents a shared S-copy of said memory block.

25. The method of claim 23 wherein said first memory access request represents a request for an exclusive M-copy of said memory block and said first valid copy of said memory block represents an M-copy of said memory block, said method further comprising the step of downgrading, upon said home node sending said first valid copy of said memory block from said home node to said first node, said first valid copy of said memory block at said home node from an M-copy of said memory block to an invalid I-copy of said memory block.

26. An apparatus for permitting a first node of a computer network to access a copy of a memory block of a distributed shared memory of said computer network having a first plurality of nodes, said memory block having a home node different from said first node in said computer network, said home node having no centralized directory for tracking states of said memory block in said first plurality of nodes other than said home node, said apparatus comprising:

a first circuit coupled to a common network infrastructure of said computer network, said first circuit configured to receive at said home node from said first node a first memory access request for said memory block; and a second circuit coupled to said common network, said second circuit configured to send, if said home node does not have a first valid copy of said memory block, a request from said home node to a second plurality of nodes in said computer network to request a second node in said computer network to send a second valid copy of said memory block to said first node, said second plurality of nodes representing said first plurality of nodes excepting said first node and said home node.

* * * * *